UNITED STATES PATENT OFFICE.

DAVID MORE, OF ROBSTOWN, TEXAS.

COMBINED SHOCK-ABSORBER AND BRACE.

1,179,209.  Specification of Letters Patent. Patented Apr. 11, 1916.

Application filed January 7, 1914. Serial No. 810,840.

*To all whom it may concern:*

Be it known that I, DAVID MORE, a citizen of the United States, residing at Robstown, in the county of Nueces and State of Texas, have invented new and useful Improvements in Combined Shock-Absorbers and Braces, of which the following is a specification.

In motor vehicles of the automobile type, generally, having the front end of the side bars of the chassis bent downward and the front springs having their forward ends pivoted to the extremities of such bent ends and having their rear ends connected by means of shackles to the side bars, thereby making provision for reaction of such springs when the vehicle is in motion, it has been found that in the event of such front springs breaking either wholly or partly the front axle is thrown out of line, thereby interfering seriously with the steering mechanism and the proper control of the machine.

The present invention provides a connection of novel form to be introduced between the front axle and side bar of the machine to act in the double capacity of brace and a shock absorber so that in the event of the front spring becoming broken or materially weakened by one or more leaves breaking, the axle will be held in line, said connection further serving to supplement the action of the vehicle to prevent shock being experienced by the rider or machinery.

A further purpose of the invention is to materially reduce the strain on the front springs of a motor vehicle and to control the rebound incident to the front wheels passing over an obstruction or dropping into a rut or depression and furthermore to maintain the axle in alinement, so that the machine may at all times be under proper control of the steering mechanism.

The invention consists of the novel features, details of construction and combination of parts, which hereinafter will be more particularly set forth, illustrated in the accompanying drawing, and pointed out in the appended claim.

Figure 1:
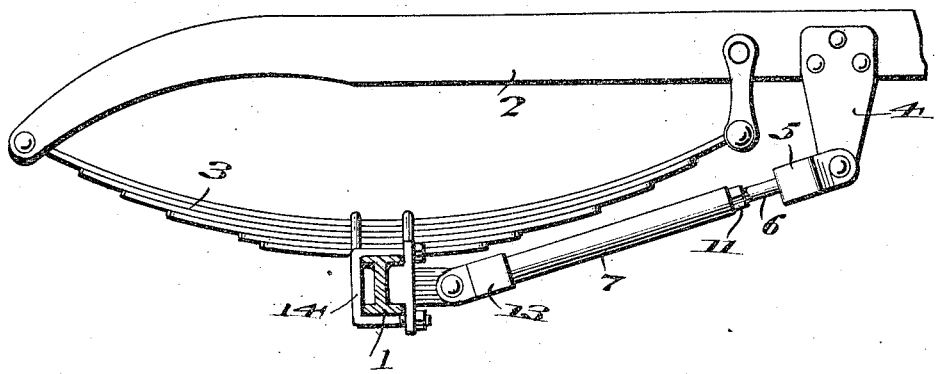
Figure 2:
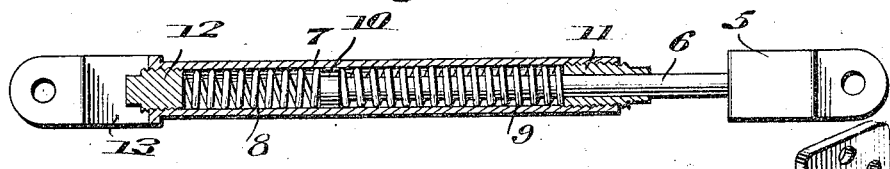
Figure 3:
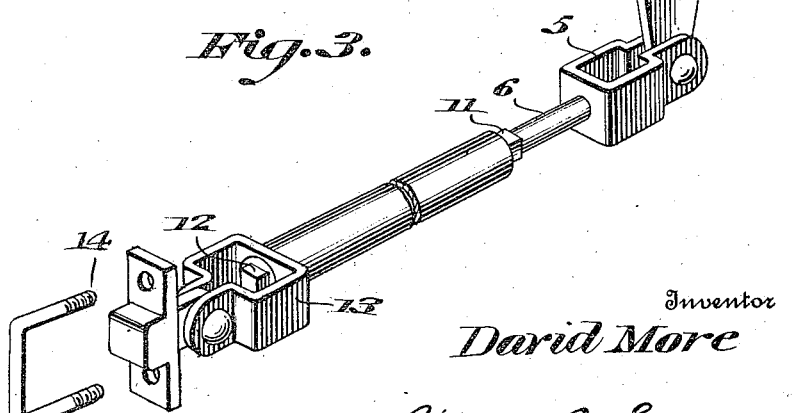

Referring to the drawings, forming a part of the specification, Figure 1 is a side view of the front spring, axle and forward portion of the side bar of an automobile showing a combined brace and shock absorber embodying the invention in operative position. Fig. 2 is an enlarged sectional view of the device. Fig. 3 is a detail view of the device showing more clearly the means for attaching the same to the axle and side bar of the machine.

Corresponding and like parts are referred to in the following description, and indicated in all the views of the drawing, by the same reference characters.

The axle 1, side bar 2 and spring 3 are ordinary parts of a motor vehicle of the automobile type, the spring 3 having its front end pivoted to the downwardly bent end of the side bar 2 and the rear end of such spring being connected to the side bar by means of a shackle, whereby provision is had for the lengthening and shortening of the spring when the latter is in action.

The present invention is in the nature of a connection which is interposed between the axle 1 and side bar 2 in the rear of such axle, said connection being inclined and having its ends pivotally connected to the respective parts, thereby admitting of the connection adapting itself to the changed relation of the pivotal joints when the device is in operation. The connection comprises telescoping parts between which springs are interposed, such springs supplementing and modifying the action of the front spring 3. A bracket 4 is secured to the side bar 2 and a clip 5 is pivoted thereto. A rod 6 is secured at its outer end to the clip 5 and is adapted to telescope with a barrel 7 within which are arranged springs 8 and 9. A piston 10 is provided at the inner end of the rod 6 and is arranged between the springs 8 and 9. The springs 8 and 9 are of helical form and expansible, the spring 8 being confined between the piston 10 and inner end of the barrel 7, whereas the spring 9 is mounted upon the rod 6 and is confined between the piston 10 and plug 11 threaded into the outer end of the barrel 7, said plug having a longitudinal opening in which the rod 6 is free to have movement. The tension of the spring 9 may be varied by adjusting the plug 11. A plug 12 closes the lower forward end of the barrel 7 and may likewise be adjusted to admit of varying the tension of the spring 8. A clip 13 is secured to the lower end of the barrel 7 and is pivotally connected to a clamp 14 secured to the axle 1. The clamp 14 admits attaching the invention to vehicles already in use or upon the market. It is obvious that the axle may have a lug formed thereon in which event the clip 13 will be pivotally connected to such lug.

In the event of the spring 3 breaking or materially weakening by rupture of one or more of its leaves, the device will come into play as a brace and hold the axle in proper place thereby preventing the same being thrown out of line and materially interfering with the proper operation and control of the vehicle through the steering mechanism. When the parts are in normal condition the springs 8 and 9 supplement the action of the spring 3 likewise serving to prevent any undue rebound resulting from any cause which ordinarily would produce shock. The device utilizes such shock and absorbs vibration, thereby resulting in material comfort to the rider and preventing undue wear upon the vehicle and the mechanism forming part of the propelling and steering elements.

While it is preferred to locate the connection in the position substantially as indicated in the drawings it is to be understood that it may be applied in any place to which it is susceptible of use.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

A combined brace and shock absorber for vehicles, the same comprising a barrel opened at its opposite ends, a rod telescoping within the barrel and provided at its inner end with a piston, expansible helical springs located within the barrel upon opposite sides of the piston, removable threaded closures at the ends of the barrel sustaining the end thrust of the springs and each being adapted for independent longitudinal adjustment for varying the tension of each of the springs, means for pivotally connecting the outer ends of the barrel and rod to the respective parts to which the device is to be secured, and means pivotally connected with one of said latter mentioned means and formed integral with one end of said barrel and serving as a guard for one of said closures.

In testimony whereof I affix my signature in presence of two witnesses.

DAVID MORE.

Witnesses:
 PAT SHUTTER,
 ALBERT E. KNOTT.